United States Patent [19]
Gilligan et al.

[11] Patent Number: 5,313,229
[45] Date of Patent: May 17, 1994

[54] MOUSE AND METHOD FOR CONCURRENT CURSOR POSITION AND SCROLLING CONTROL

[76] Inventors: Federico G. Gilligan; Fernando D. Falcon, both of Lavelle 682, 1047 Buenos Aires, Argentina

[21] Appl. No.: 14,388

[22] Filed: Feb. 5, 1993

[51] Int. Cl.⁵ .................................................. G09G 5/08
[52] U.S. Cl. .................................... 345/157; 345/163; 345/123
[58] Field of Search ............... 340/710, 709, 724, 726; 74/471 XY; 250/221, 229, 231.14, 231.13; 200/260, 553, 68; 338/114, 155, 170, 172, 162, 167; 273/856

[56] References Cited

U.S. PATENT DOCUMENTS

| | | | |
|---|---|---|---|
| 3,310,768 | 3/1967 | Opalenik | 338/167 |
| 3,541,541 | 11/1970 | Engelbart . | |
| 4,301,345 | 11/1981 | Balta | 250/229 |
| 4,364,035 | 12/1982 | Kirsch . | |
| 4,546,347 | 10/1985 | Kirsch . | |
| 4,552,360 | 11/1985 | Bromley | 273/85 G |
| 4,698,616 | 10/1987 | Krohn | 250/231.13 |
| 4,786,895 | 11/1988 | Castaneda | 340/709 |
| 4,866,602 | 9/1989 | Hall . | |
| 4,891,632 | 1/1990 | Chang | 340/710 |
| 4,897,629 | 1/1990 | Lecklider | 338/114 |
| 4,994,795 | 2/1991 | MacKenzie | 340/710 |
| 5,063,289 | 11/1991 | Jasinski et al. . | |
| 5,095,302 | 10/1992 | McLean et al. . | |
| 5,095,303 | 5/1992 | Clark | 340/709 |
| 5,122,785 | 6/1992 | Cooper . | |
| 5,132,672 | 7/1992 | Clark . | |

*Primary Examiner*—Alvin E. Oberley
*Assistant Examiner*—Aaron Banerjee
*Attorney, Agent, or Firm*—Michael J. Striker

[57] ABSTRACT

In a manual input device for controlling a cursor on a computer display (e.g., a mouse), a supplementary proportional control device including a spring-loaded lever displaceable from an equilibrium position in either of two directions and protruding out of the mouse housing is provided for concurrently controlling the scrolling operation. The supplementary control signal is generated in response to operation of a lever designed to be driven by the thumb of the same hand which holds the mouse. The control signal varies according to the discplacement amount of the lever from its equilibrium position and the displacement direction and thus is used as a scrolling rate and direction control. An associated method is provided for setting the scrolling direction in correspondence to the dominant axis of the cursor's trail. Detecting an approximately circular movement of the cursor sets the scrolling axis perpendicular to the screen plane (i.e., in a third dimension).

17 Claims, 9 Drawing Sheets

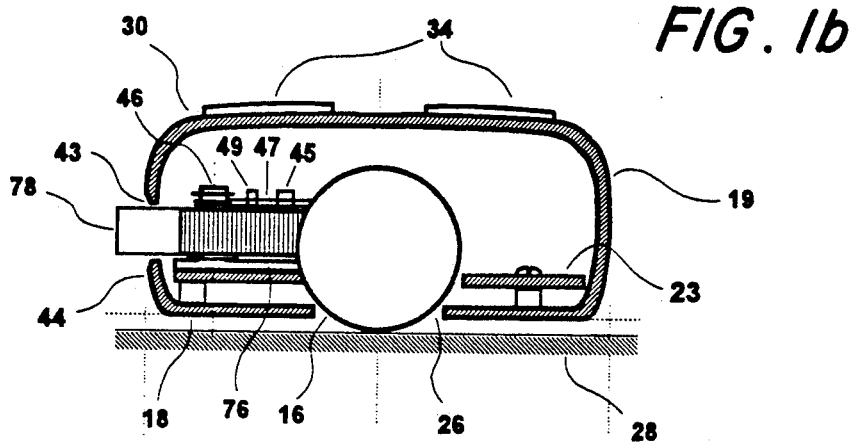
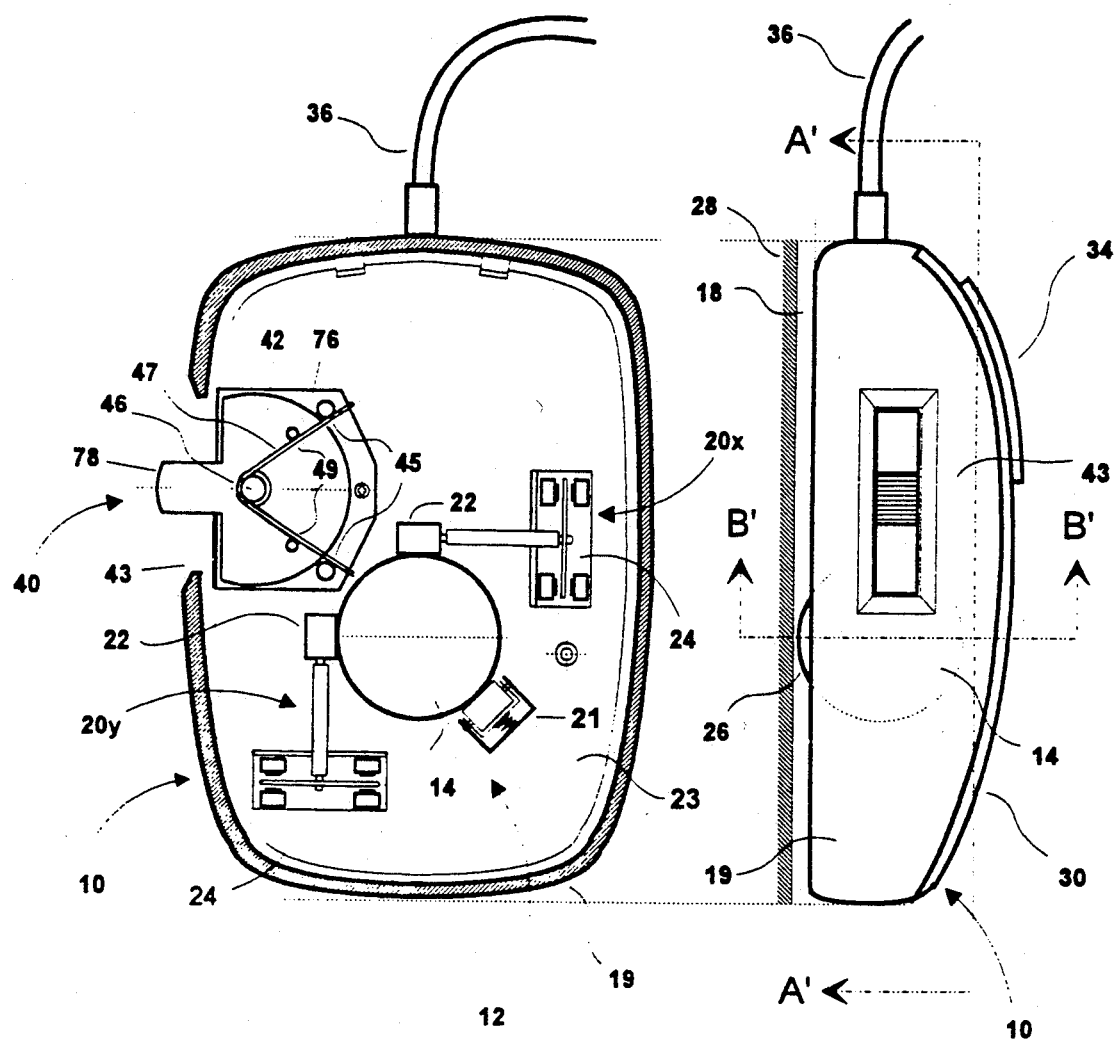
FIG. 1b
FIG. 1a
FIG. 1c

MOUSE AND METHOD FOR CONCURRENT CURSOR POSITION AND SCROLLING CONTROL

BACKGROUND OF THE INVENTION

The present invention relates to computer input devices in which a transducer converts translational motion of a housing into a position signal for controlling movement of a cursor associated with a visual display system. More particularly, the present invention relates to an input device capable of generating further additional control signals and an associated method for improving and speeding up its operation.

A mouse, as it has come to be known in the lexicography of the prior art, is a widespread computer input device, which has become greatly accepted among personal computer and computer terminal users.

Computer peripheral input devices of this type are described for example in U.S. Pat. No. 3,541,541 issued to Engelbart for a mechanical mouse Nov. 17, 1970 and U.S. Pat. No. 4,866,602 issued to Hall, Sep. 12, 1989. A mechanical mouse consists essentially of a housing which can be slid by a single hand over a flat surface to generate a pair of signals in response to the relative motion of the housing over the flat surface.

These signals are produced by a transducer typically located on the bottom or belly of the housing and are transmitted to computer means via communication means (e.g., a flexible cable connected to a computer's input port). The pair of signals represent orthogonal incremental motion components of the mouse in the x and y directions over the flat surface, in a suitable scale.

Generally the mouse movement is visually fed back to the user by a graphic symbol or cursor displayed on the computer screen that copies the mouse's movement creating the illusion in the mind of user of directly moving it with his or her own hand. The application program derives user commands according to spatial relationships between the displayed information and the cursor position on the screen when a switch is activated (usually in the form of a push-button or similar means) provided on the back of the mouse for generating binary (i.e., on-off) control information.

A three-dimensional mouse, which produces three different signals representing orthogonal incremental position components in the x, y and z directions for use e.g., in positioning an object in a three-dimensional isometric display on a computer display means, is described in U.S. Pat. No. 5,132,672 issued to Clark, Jul. 21, 1992 and also in U.S. Pat. No. 5,095,302 issued to McLean Mar. 10, 1992. These devices operate producing signals for positions in the x and y directions in the same manner as in the conventional two-dimensional mouse and by producing the signal for the z direction by a transducer connected with a digit operable moveable component such as a roller-belt or pressure sensitive button. Thus signals for the x and y direction are produced by motion of the mouse over a plane surface, but signals for the z direction are produced by motion of the moveable component by a finger or thumb of the hand moving the mouse.

The mouse's capability to generate position signals plus one or more binary control signals with just one hand of the user, has turned it into a most useful tool for interactive computer program control.

Its flexibility when used in combination with graphic programs, either graphic applications themselves or using the computer's graphics capacity as an interactive user-machine interface, made this instrument a very popular input device, mostly for personal computer applications.

Moreover, we have observed that in most computer applications the data space the user is working on is too large to be displayed at the same time in the display means of the computer. This is particularly true when working in a window environment in which the screen is divided into several separate areas, each of which display a different data space. In normal operation of a mouse this situation arises repeatedly forcing the user to abandon his or her main task and drive the cursor to screen areas assigned for scrolling commands, using up a significant amount of his or her useful time. Hence, since the display means generally shows just a portion of its associated data space, usefulness of the mouse is limited when the data field to be accessed is not included in the displayed portion.

Accordingly there is a need for an input device that can carry out this operation in a fast and efficient manner while maintaining the original mouse concept of driving a cursor.

A squeezable mouse is known and is structured to issue scrolling commands to a computer means displaying an interactively operated program. When the sqeezable mouse is squeezed binary switches are closed sending a binary command to the computer. This is equivalent to providing a mouse with a third button on its back for sending an additional binary control command but using a different mouse handling technique. This solution is described in U.S. Pat. No. 5,122,785 issued to Cooper, Jun. 16, 1992.

All known mice and methods for scrolling information displayed by a computer in a computer display means are based on positioning or moving a cursor within pre-determined areas of the display means and issuing binary control commands (i.e., operating pushbuttons or similar binary control means) while the cursor is positioned or moved within the boundaries or across the boundaries of those pre-determined areas. For example in U.S. Pat. No. 5,122,785 referred to above, several methods for scrolling are disclosed which are based on these principles.

These solutions do not provide concurrent cursor positioning and scrolling control because the apparatus on which they rely do not have separate control means for that purpose, requiring the allocation of the x-y cursor control means of the mouse to perform scrolling operations.

Furthermore, since methods used with those devices are based on driving the cursor to pre-determined areas of the display means, they do not allow the issuing of scrolling commands from an arbitrary cursor position. This tends to increase the average x-y cursor translation distance since the scrolling commands represent a significant part of the set of commands issued by a user in an interactive operation of a computer. This results in mouse productivity loss and also forces the user to abandon his or her main task to drive the cursor to the pre-determined screen areas diverting his or her attention.

Moreover, scrolling operations generally need to be performed in a gradual way, scanning the data space in incremental steps through successive approximations so as to keep track of the displayed information until the desired data field is reached. This requires an appropriate apparatus and an operating method capable of providing a tight scrolling control to allow fast scrolling direction switching and a wide range of available scrolling velocities.

Also, with the increasing popularity of application programs and user interfaces based on three-dimensional data array concepts (e.g., three dimensional spreadsheet programs) there is a need of a mouse capable of providing an improved way to operate these programs, allowing a user to scroll not only within a plane display but through successive three-dimensional data layers.

These requirements are not satisfied in a complete manner by any of the conventional mouse devices known in the industry. This is because the conventional mice are conceived to drive a cursor on a finite workspace bounded by the screen limits and are equipped with devices for generating only either movement information or binary control information.

Thus there is a need for an ergonomic mouse device and method for using it to enhance productivity, speed and efficiency of interactive operation of a computer by a user.

SUMMARY OF THE INVENTION

It is an object of the present invention to extend these limits with a new mouse and associated method for improving its control capabilities while maintaining the ease of use and intuitive operation which has made it so popular.

It is also an object of the present invention to provide an improved mouse designed to take advantage of available skills in contemporary users, which is held and used much in the same way as the mouse of the prior art, thus requiring no further training of the user.

It is a basic object of the present invention to provide a mouse which not only enables the user to drive a cursor over a screen of a display means, but also to smoothly scroll the displayed information at a plurality of speeds and at the same time to control the cursor position.

It is an additional object of the invention to minimize time, arm motion and user effort in performing scrolling operations with a mouse on a display device in an interactive operating environment.

It is also another object of the present invention to provide an improved mouse having features set forth above and which can be easily made fully compatible with state-of-the-art related means, accessories and applications.

It is another object of the present invention to provide a mouse of the foregoing type which is not more expensive to manufacture than a conventional two-dimensional mouse and which is fully compatible with state-of-the-art computer means and accessories.

According to the invention the mouse having means for scrolling as well as cursor positioning includes a supplementary control means for producing a supplementary control signal from which scrolling commands are derived when the supplementary signal is input to a computer. The supplementary control means includes a displaceable element movable by a digit of the hand moving the mouse and having a bounded range of displacement amounts. The displaceable element is moved against a restoring force of a spring means from an equilibrium position in which no displacement signal is generated so as to produce a signal representing the amount of displacement of the displaceable element from its equilibrium position.

The supplementary control means can be a lever projecting out of the housing to be operated by the user's thumb of the same hand with which he or she operates the mouse. The lever is urged to a release or equilibrium position (i.e., no displacement) with a suitable restoring mechanism providing a suitable reluctance and is mechanically engaged with a supplementary transducer for generating the supplementary control signal representing the lever's displacement in an appropriate scale. This control signal is encoded, combined with other mouse generated signals and transmitted to the computer using similar techniques and means as in conventional mice. The supplementary control signal is then processed combined with the x-y motion signals to control the scrolling operation through a method comprising detection of the dominant axis of the cursor motion's trail and generating incremental scrolling commands parallel to that axis at a rate determined by the amount of displacement of the lever from its equilibrium position, in a positive or negative direction according to the sign of the displacement.

The main advantage of the mouse and method according to the invention is that it allows the user to, concurrently and accurately control the scrolling of the text over which the cursor is being moved, thus extending the mouse's usefulness to control not only the cursor position but the whole navigation process over a certain data space.

Moreover, the supplementary control means can provide a signed scrolling rate control, since the sign of the displacement can be used to provide a positive or a negative going control signal. It allows a tight scrolling operation and a wide rate variation with output signal proportional to displacement amount, providing adequate processing of the control signal, as is apparent form the detailed description herein below.

From a productivity standpoint, since the control device is part of the mouse system and it is inherently capable of generating bursts of scrolling commands of unlimited length without any mouse movement and regardless of its current position on the screen, the average x-y sliding distance of the mouse during interactive operations can be significantly reduced by eliminating repetitive trips to screen areas assigned to scrolling control (e.g., the scroll bars). This leads to significant time savings and hence to greater mouse productivity and user comfort. Furthermore the mouse according to the invention is comparatively inexpensive since it only requires a comparatively few extra parts compared to those of the conventional prior art mouse. The associated method of operating a computer in an interactive manner using the mouse according to the invention allows control of the scrolling operation in both horizontal and vertical directions with a single supplementary control means.

BRIEF DESCRIPTION OF THE DRAWINGS

The objects, features and advantages of the present invention will now be illustrated in more detail by the following detailed description, reference being made to the accompanying drawing in which:

FIG. 1a is a schematic horizontal cross-sectional view through an embodiment of a mouse according to the invention showing a mechanical portion of the supplementary control means for scrolling;

FIG. 1b is a transverse cross-sectional view through the mouse shown in FIG. 1a taken along the section line B'—B' of FIG. 1c;

FIG. 1c is a side elevational view of the mouse shown in FIG. 1a;

FIG. 2a is a detailed transverse cross-sectional view through the mouse and the supplementary control means shown in FIG. 1a;

FIG. 2b is a detailed horizontal cross-sectional view through the mouse shown in FIG. 1a;

DETAILED DESCRIPTION OF THE PREFERRED EMBODIMENTS

Figure 2A:
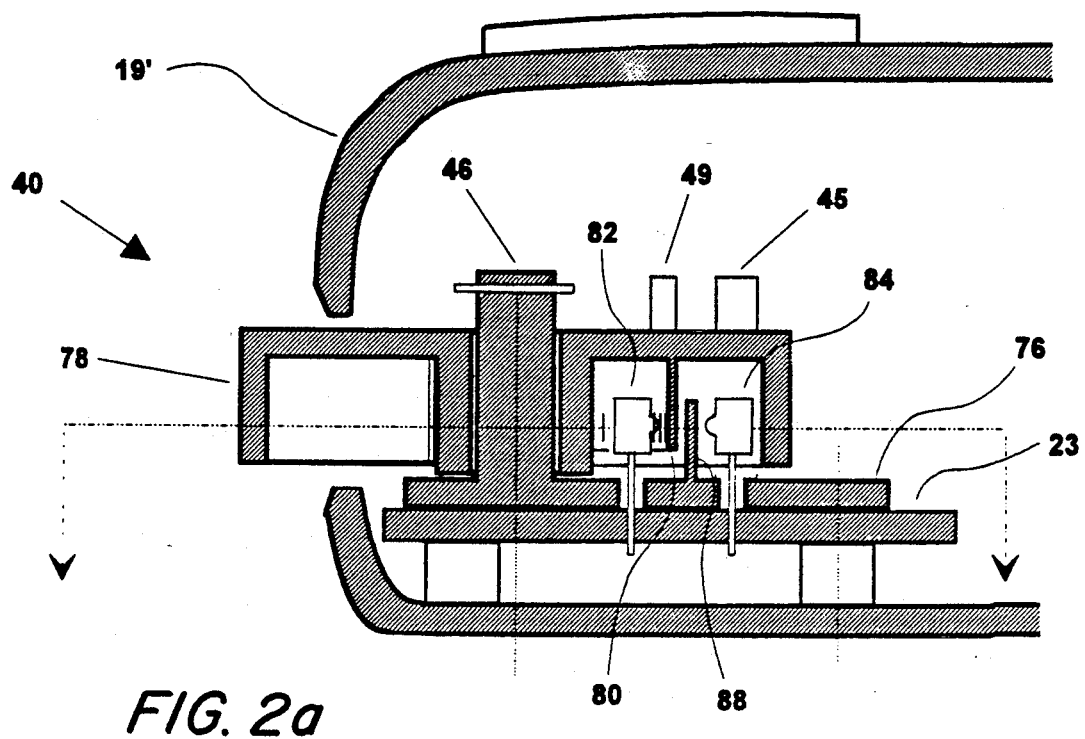

FIG. 1 illustrates a physical embodiment of a mouse 10 according to the invention which is derived from a basic mouse structure, which is known in the prior art.

The mouse 10 of FIGS. 1a to 4 comprises a housing 19 having a flat underside or base 18. The underside 18 opens inwardly, approximately in its center, to form a spherical hollow 16. The housing 19 accommodates an x-y movement transducer 12 including a ball 14. The ball 14 is retained in the hollow 16 in such a way that it may rotate freely in any direction relative to the mouse's housing 19. The housing 19 contains a printed circuit board 23, on which the mouse logic circuit means is mounted. A pair of rotation encoders 20x and 20y which are part of the x-y movement transducer 12 are also mounted on the printed circuit board 23. Each rotation encoder 20x, 20y is coupled to the ball 14 by a respective roller 22 which transmits rotation from one (the ball 14) to the other (encoder 20x, 20y). The pair of rollers 22 together with a freely rotatable cylinder 21, which is urged by a spring towards the ball 14, help to retain the ball 14 in the spherical hollow 16. The axles of the transducers 20x, 20y are connected to corresponding mechanical-to-electrical incremental converters 24.

A small part of the ball 14 projects slightly from the flat base 18, to enable contact with a horizontal plane surface 28 for resting and moving the mouse 10. The mouse 10 has a topside or back 30 on its top, shaped to fit a user's hand to facilitate its operation.

The rotary transducers 20x, 20y each have a pair of outputs X1–X2 and Y1–Y2, as disclosed further herein below in relation to FIG. 3. These signals taken together define all aspects of the rotation of the ball 14 according to orthogonal directions x and y on the plane surface 28.

FIG. 1 also shows push-buttons 34 typically placed on the top surface 30 of the housing 19, approximately so that a user's index and middle fingertips can reach them when the user operates the mouse.

According to the present invention, the mouse 10 also includes supplementary control means 40 for generating an additional control signal for scrolling in response to movement of a spring loaded mechanism designed to be operated by a thumb of the same hand which holds and moves the mouse. In the preferred embodiment, this supplementary control means comprises a movable part 42 of approximately semi-circular shape mounted rotatably on an pivot axle 46 fixed to a baseboard 76. Baseboard 76 is mounted on the printed circuit board 23. The supplementary control means 40 further comprises a lever 78 fixed to the movable part 42 and protruding through an opening 43 on one side 44 of the housing 19. Lever 78 with movable part 42 are urged to a central released or equilibrium position by spring means 47 which consists of a resilient wire 47 wound around the pivot axle 46 and held in place by a pair of stops 49 fixed to the movable part 42 and by another pair of stops 45 fixed to the baseboard 76.

Figure 2B:
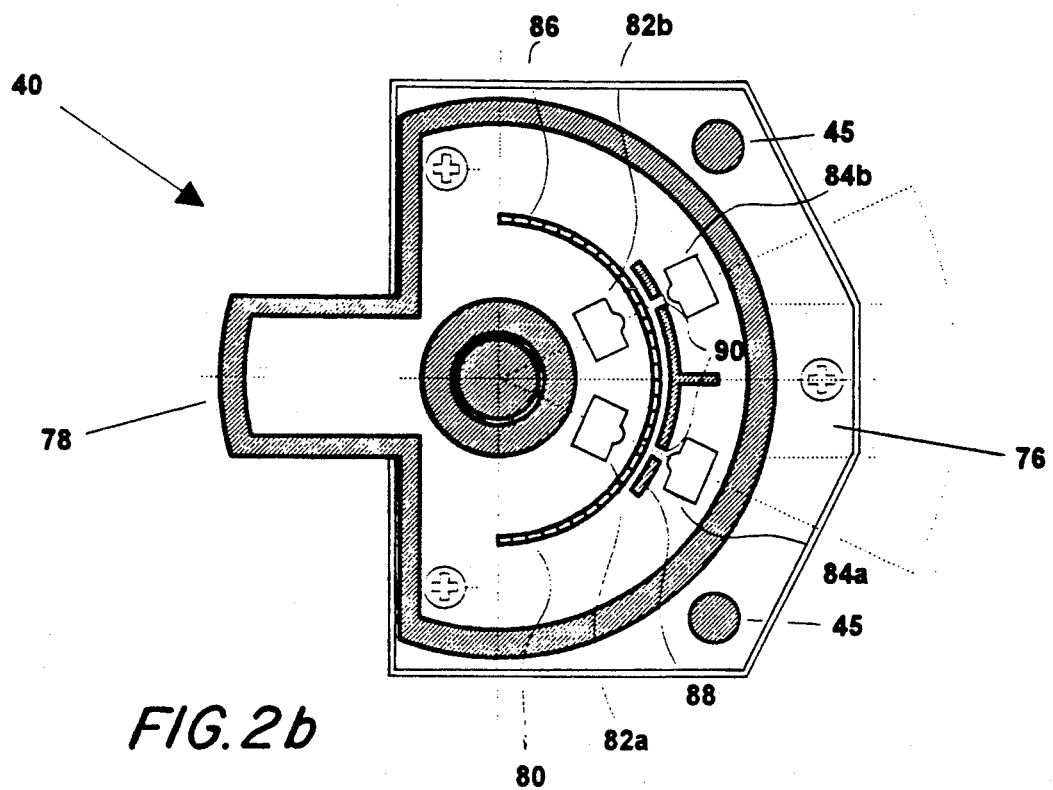

FIGS. 2a and 2b are detailed views of the mechanism and mounting of the supplementary control means 40. The baseboard 76 is mounted on the printed circuit board 23 and has supporting axle 46 on which the movable part 42 is pivotally mounted to rotate within an angle determined by spring means 47 and the pairs of stops 45 and 49. The movable part 42 includes an inner, concentric semi-circular slotted skirt 80. At two angularly spaced locations opto-coupler pairs are placed as shown in FIGS. 2a and 2b. Each opto-coupler pair comprise a light emitting diode (LED) 82 and a photo-transistor 84 connected to the printed circuit board 23, advantageously by soldering. The skirt 80 has a plurality of slots 86 evenly spaced and the skirt 80 is positioned to alternately block and let through light emitted by each LED 82 to its corresponding photo-transistor 84 as the lever 78 is operated. The angle between one pair of opto-sensor 82a, 84a and the other 82b, 84b is set according to the slot density adopted for the skirt 80, so that the pulses generated have a phase difference close to 90° as required to extract the motion sign information out of these signals. The baseboard 76 further includes a fixed skirt portion 88 extending circumferentially only over a portion of the circumferential extent as the slotted skirt 80 and having two complementary fixed slots 90 each positioned between the photo-transistor 84 and light emitting diode 82. Thus the fixed skirt portion 88 acts as a diaphragm or mask to enhance resolution regardless of tolerances obtained when soldering the opto-coupler components to the printed circuit board 23. Utilizing suitable small opto-coupler pairs such as the Motorola's MLED71 and MRD701 and a slot width of 1 millimeter, a resolution of approximately 80 transitions in a 90° lever shift may be obtained for a skirt diameter of 2.5 centimeters, which allows a smooth enough operation.

The mouse 10 has been designed for right-handed users. A left-hand mouse is simply the mirror image of the one shown with the mirror plane being the central longitudinal plane.

Figure 3:
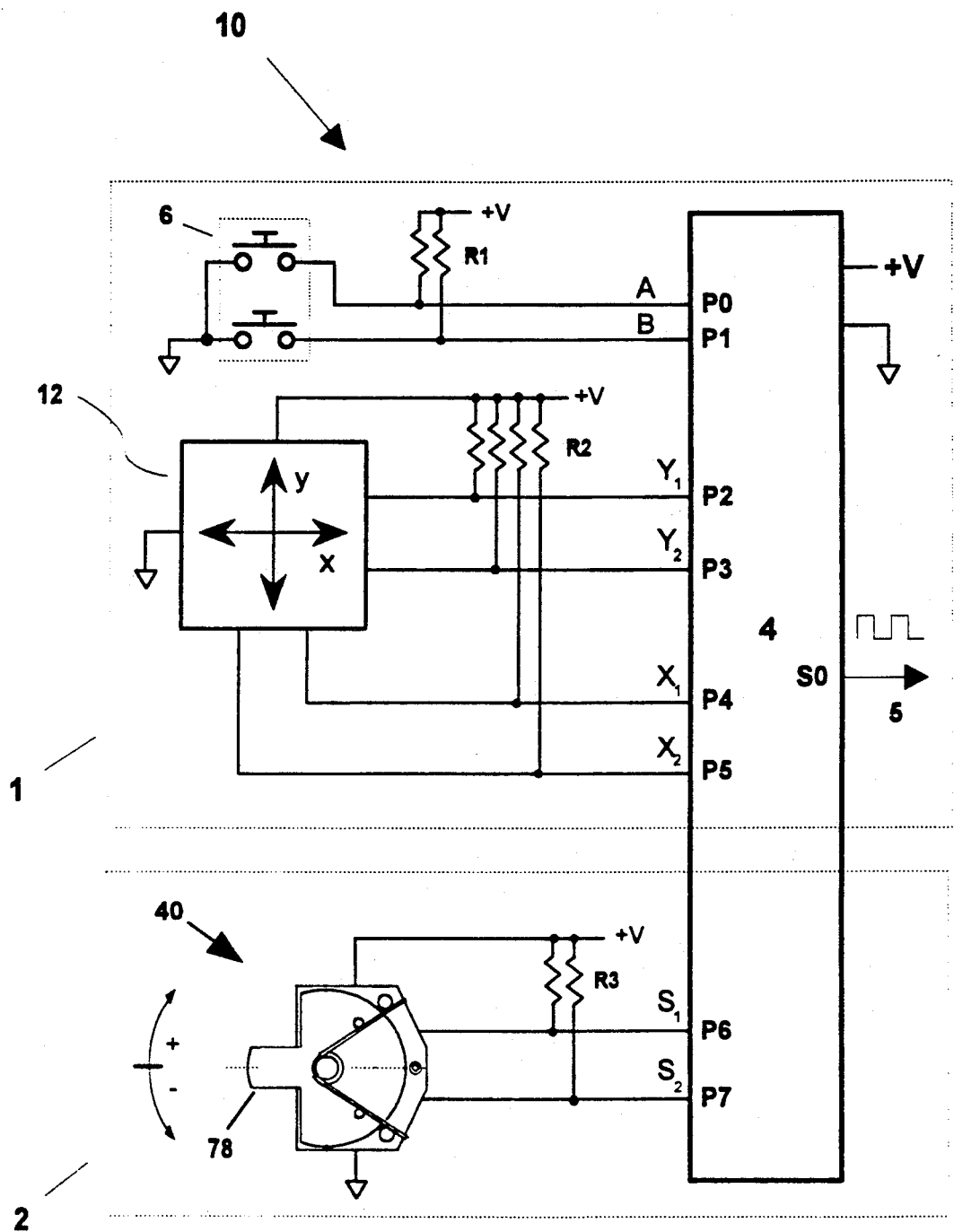
FIG. 3 is a block diagram of the mouse of FIG. 1a in which the conventional mouse's components are delimited by block 1 and the novel components of the invention are delimited by block 2.
Figure 4:
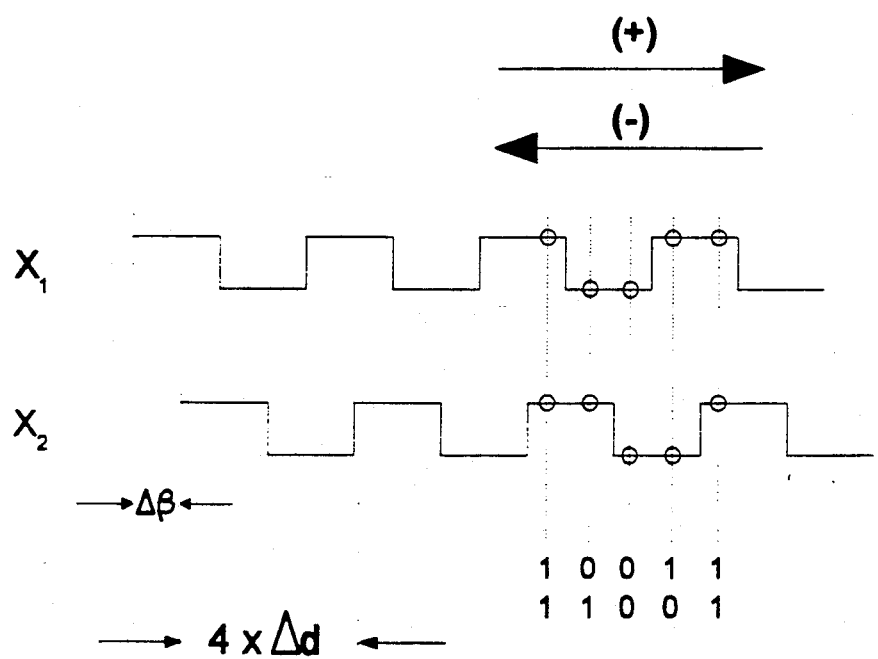
FIG. 4 is a time chart showing synchronous quadrature pulse signals generated by the x-y motion transducers of a conventional mouse, and which are also similarly generated by the supplementary control means or transducer associated with the scrolling control of the invention.

FIG. 3 is a block diagram of the electronic circuit of the mouse 10 according to the preferred embodiment of FIG. 1a. The figure shows a conventional mouse system delimited by block 1, including an x-y transducer assembly 12 responsive to movement of mouse 10 over a plane surface 28 of a pad. Although a mechanical mouse is used as the basis of the embodiments shown here, it is not the only way the invention can be practiced. Transducer assembly 12 may be o a mechanical type, like that disclosed in U.S. Pat. No. 3,541,541, referred to herein above, or of the electro-optical type like the one disclosed in U.S. Pat. Nos. 4,364,035 and 4,546,347 both to Kirsch. In general any device capable of tracking the mouse's x-y movement is suitable as this transducer 12.

Transducer 12 in the embodiment shown here generates a set of two pairs of signals X1-X2 and Y1-Y each one representing signed x and y incremental components of the mouse's movement in orthogonal axis. Generic resistors R2 bias the outputs X1, X2, Y1, Y2 from the transducer 12. These outputs issue synchronous quadrature pulse signals as displayed in FIG. 4. Each quarter cycle represents an elementary distance $\Delta d$ according to a predetermined scale. As it can be seen in FIG. 4, the variation of the signals' status taken together in each quarter cycle gives all the motion information provided the signals have a phase difference close to 90° to each other. A change in the status of the signals at two different moments defines a transition and provides the motion direction information as summarized in Table I herein below.

TABLE 1

| $X1_n, X2_n$ | $X1_{n+1}, X2_{n+1}$ | Motion Direction |
|---|---|---|
| 00 | 00 | 0 |
| 00 | 01 | −1 |
| 00 | 10 | +1 |
| 00 | 11 | x |
| 01 | 00 | +1 |
| 01 | 01 | 0 |
| 01 | 10 | x |
| 01 | 11 | −1 |
| 10 | 00 | −1 |
| 10 | 01 | x |
| 10 | 10 | 0 |
| 10 | 11 | +1 |
| 11 | 00 | x |
| 11 | 01 | +1 |
| 11 | 10 | −1 |
| 11 | 11 | 0 |

In Table I the column marked "$X1_n, X2_n$" represents the signals' status prior to detection of the transition and the column marked "$K1_{n+1}, X2_{n+1}$" represents the status after transition. The third column shows the incremental signed value of the motion detected. Transitions marked with an "x" are not possible in the scheme of FIG. 4 and are usually used as an error signal indicating a transducer malfunction.

As shown in FIG. 3, both pairs of X and Y signals are read by parallel inputs P2 through P5 of a logic circuit means 4 which processes the signals to detect mouse motion according to Table I and generates an output signal S0 on an appropriate lead 5. This signal contains the incremental x-y motion information which is transmitted to the computer. FIG. 3 also shows two binary (i.e., on-off) keys 6 biased via generic resistors R1. Keys 6 generate binary signals A and B for inputs P0 and P1 of the logic circuit 4 which encodes them together with the x-y position signals transmitting a composite signal to a computer for further processing.

Although output 5 has been represented as consisting of a single conductor, signal S0 may be conveyed in either parallel or serial format, via either conductor means 36 or wireless means such as radio link, light beam or infrared radiation.

Only two keys 6 are shown however the mouse may include more than two. The keys can be mechanical switches but they may also be capacitive switches, conductive rubber switches or any other suitable type of binary switches.

In the preferred embodiment the supplementary control means 40 shown in block 2 of FIG. 3 generates a third pair of control signals S1 and S2 in the same format as the X1, X2, Y1 and Y2 signals generated by the x-y motion transducer. These control signals are generated in response to a displacement of the lever 78 from its equilibrium position shown in FIGS. 1a and 9b to a displaced position (FIG. 5b). These signals are used to control the scrolling rate. Signals outputs S1 and S2 are respectively connected to inputs P6 and P7 of the logic circuit means 4 and are processed in the same way as the group of conventional signals X1, X2, Y1, Y2.

The logic circuit means 4 can be a microcomputer configured with at least one 8-bit parallel input port and a serial output port (or a parallel port capable of emulating a serial port), such as Motorola's MC146805 integrated circuit or the like. Both the x-y motion signals X1, X2, Y1, Y2 and the control signals S1 and S2 plus the binary signals A and B ar connected to P0 through P7 inputs of a parallel port of the microcomputer to be read and processed as described above.

In the preferred embodiment, the signal issued by output 5 is in a serial format and made into data packets using a technique described by John C. Hall in U.S. Pat. No. 4,866,602.

According to this technique, whenever there is any change in the state of the mouse, the mouse logic circuit means generates a packet of three 7-bit bytes. A change of state is defined as any mouse movement or any change in the status of its binary keys. Each transmitted three-byte packet is an accumulation of all mouse activity that has occurred since transmission of the previous packet. The following Table II shows this prior art packet format:

TABLE II

|  | B6 | B5 | B4 | B3 | B2 | B1 | B0 |
|---|---|---|---|---|---|---|---|
| Byte 1 | 1 | Left | Right | Y7 | Y6 | X7 | X6 |
| Byte 2 | 0 | X5 | X4 | X3 | X2 | X1 | X0 |
| Byte 3 | 0 | Y5 | Y4 | Y3 | Y2 | Y1 | Y0 |

In this prior art format, B6 is used as a synchronizing bit and is "1" for the first byte and "0" for the second and third bytes. Bits "Left" and "Right" in the first byte represent the state of the left and right binary keys 6 respectively. A "1" represents a key pressed and a "0" represents a key released. Bits X7 through X0 and Y7 through Y0 represent incremental motion in the respective x and y axis in an two's complement signed integer eight-bit representation.

According to the present invention, the above packet structure is modified to include a fourth byte to convey the incremental position information pertaining to the supplementary control means 40. The resulting structure is shown in the following Table III:

TABLE III

|  | B6 | B5 | B4 | B3 | B2 | B1 | B0 |
|---|---|---|---|---|---|---|---|
| Byte 1 | 1 | Left | Right | Y7 | Y6 | X7 | X6 |
| Byte 2 | 0 | X5 | X4 | X3 | X2 | X1 | X0 |
| Byte 3 | 0 | Y5 | Y4 | Y3 | Y2 | Y1 | Y0 |
| Byte 4 | 0 | S5 | S4 | S3 | S2 | S1 | S0 |

The synchronizing bit B6 is always "0" in the fourth byte. Bits S5 through S0 represent the angle the lever 78 has been turned since the transmission of the previous packet in a two's complement signed integer six-bit representation which is adequate in practice, since the supplementary control means 40 tends to accumulate a much lower number of transitions than the x-y transducer 12. This arrangement allows full compatibility with conventional mice already using this packet format and allows a mouse driver means to automatically detect what type of mouse is connected to the computer and process the signal accordingly. The absence of the fourth byte (i.e., a conventional mouse connected to a computer) may be interpreted as a null lever displacement by the rest of the system.

The disclosure herein before refers to the physical preferred embodiment of the present invention. Following is the explanation of the associated method of using the scrolling mouse 10 according to this invention to get full advantage of its operating features.

Unlike the conventional methods mentioned herein before for issuing scrolling commands to a computer program, using a mouse which are based on driving the cursor to predetermined screen areas and issuing binary control commands therein, the method for issuing scrolling commands using the mouse 10 of the invention is based on moving the mouse from an arbitrary position in such a way as to approximately define a cursor trail pattern recognizable by a computer program to dynamically select a scrolling axis and start a scrolling operation by moving the lever 78 to select the scrolling rate and direction along the selected axis.

In a two-dimensional data space, the recognizable patterns are reduced to two lines parallel respectively to the x and y screen axis. Thus the scrolling axis is simply set according to the dominant component in the cursor trail.

In a three-dimensional data space, a third pattern may be defined so as to allow the selection of the third scrolling axis (perpendicular to the screen plane).

From a user's standpoint the resulting effect is that the lever acts as an extender of the mouse movement, since the scrolling axis is always set by the user's intention expressed in the cursor's trail dominant axis. This means that the user may drive the cursor all over a certain window while concurrently scrolling said window on the run, using the lever as a continuous in-mouse scrolling control.

Figure 5C:
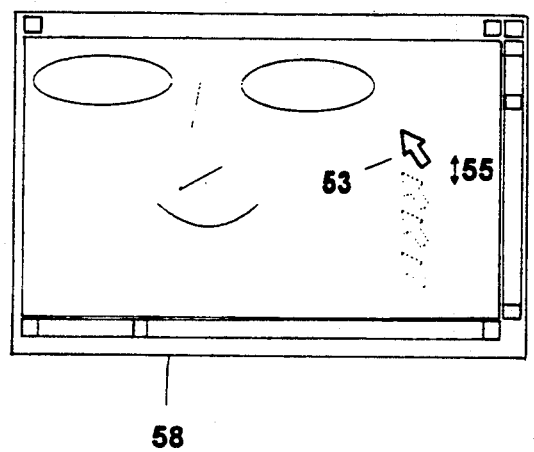
FIGS. 5a–5d illustrate a method of using the mouse according to the invention and are diagrammatic views illustrating how the mouse is operated.
Figure 5D:
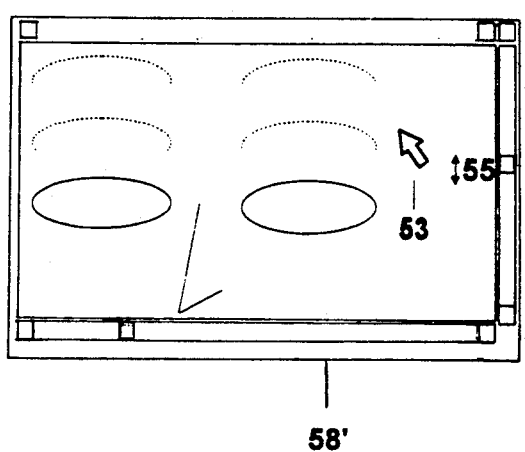
Figure 5A:
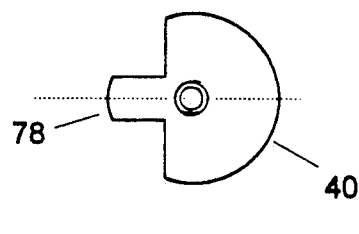
Figure 5B:
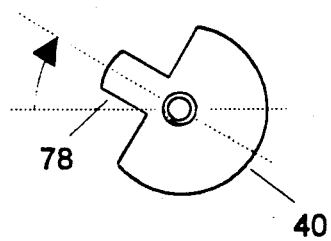

FIGS. 5a and 5b sketch show how scrolling operations are carried out with the mouse and method of the present invention. In FIG. 5a a window 58 is displayed before the computer receives a burst of incremental scrolling commands generated by the control means 40 of the invention. In FIG. 5b window 58' is displayed after the computer has executed the commands. According to the method, in FIG. 5a he user moves the mouse slightly in the direction 55 he or she wishes to scroll the window, and the cursor moves in response to that movement. The computer program dynamically detects the dominant axis of the cursor trail as a result of the mouse movement and sets the scrolling axis status variable correspondingly. In FIG. 5b the user turns the lever 78 to start the scrolling operation in the axis selected in FIG. 5a The lever displacement measured from its initial equilibrium position controls the rate and direction of the scrolling motion in the selected axis.

Hence, the action of the supplementary control means 40 of the invention complements the x-y motion of the mouse to reach the desired field, virtually extending the essential pointing function of the mouse beyond the screen boundaries. The x-y motion detector 12 controls movement of the cursor 53 relative to the window 58 (what may be defined as the physical cursor movement), while the supplementary device 40 likewise controls movement of the window 58 relative to its associated data space (what hence may be defined as the logical cursor movement).

Figure 6:
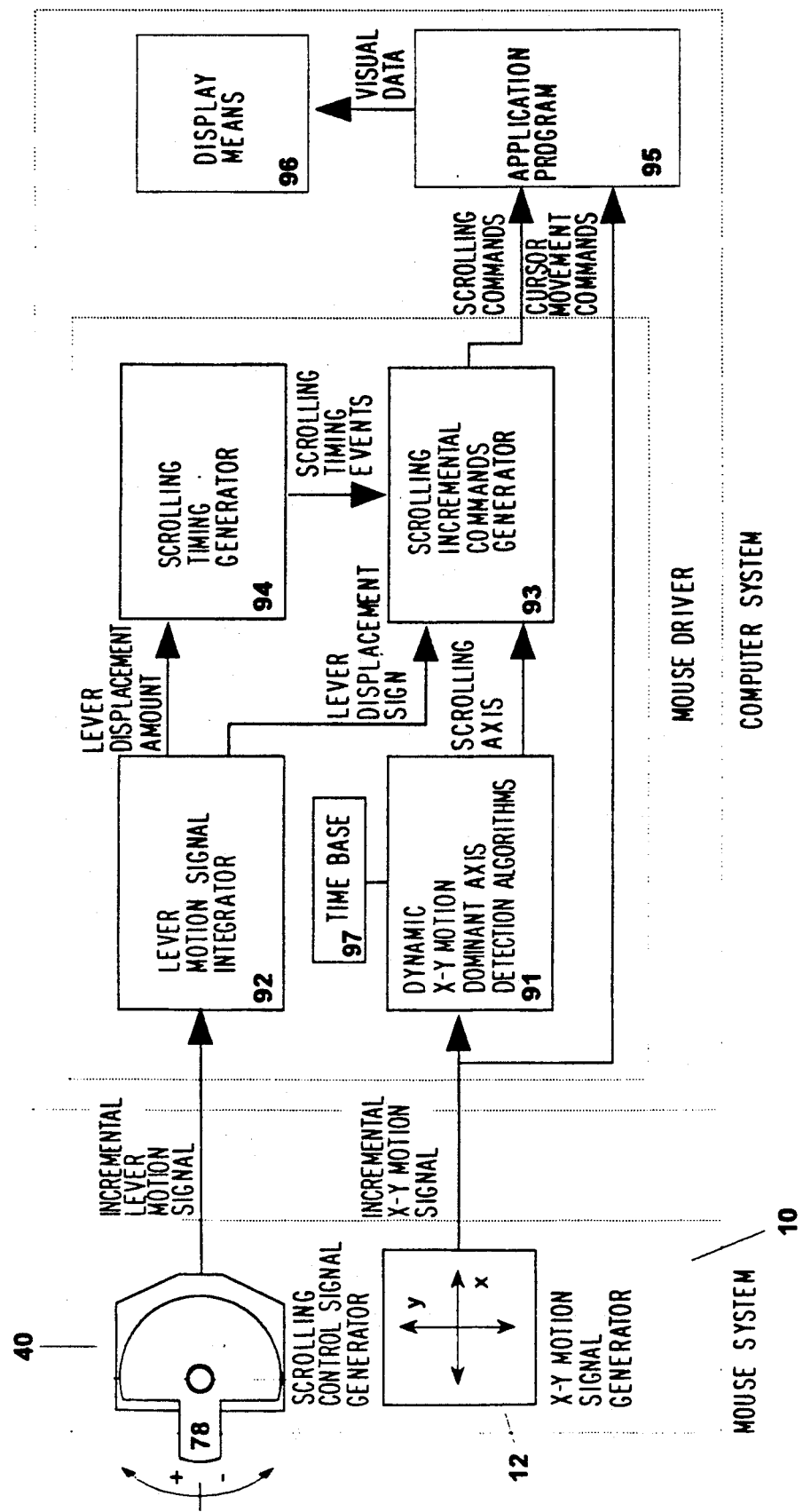
FIG. 6 is a block diagram of a computer system using the mouse of FIG. 1a and 3 according to the invention.

FIG. 6 is a block diagram of a computer system using the mouse and method of the present invention. A special mouse driver architecture must be used to translate the signals generated by the mouse 10 into scrolling and cursor movement commands. The x-y signals generated by the x-y transducer plus the scrolling control signals generated by the supplementary control means 40 of the mouse are processed to allow the user to control the scrolling operation in three axes using a single scrolling control means and from an arbitrary cursor position.

The signal generated by the logic circuit 4 pertaining to the scrolling control means 40 is processed by processing circuit means 92 of FIG. 6, which comprises software routines for calculating the actual lever position from the incremental signals generated by the lever position detector. Circuit means 92 generates a first output proportional to the displacement of the lever 78 from its equilibrium position which is fed to a scrolling timing generator circuit means 94 which produces a periodic signal having a rate which is a function of its input signal. Circuit means 92 also produces another signal which is a flag signal representing the sign of the lever's displacement from its equilibrium position which represents the scrolling direction within the selected axis and which is input directly into a scrolling incremental commands generator circuit means 93. The scrolling timing generator circuit means 94 comprises a hardware-software timer for generating periodic signals to trigger the incremental scrolling commands issued by the incremental scrolling commands generator circuit means 93 to the application program at a dynamically adjustable rate under user control. These scrolling commands are communicated to the application program through a suitable software path, by similar means as the cursor control commands.

The x-y signals generated by the mouse's x-y transducer 12 are by-passed to the application program 95 of FIG. 6 or controlling the cursor movement as it is usually done. A copy of these signals is input to processing circuit means 91 which contains software algorithms for detecting the dominant axis (x or y) of the cursor's trail as it is moved over the display mean 96. The output of processing circuit means 91 is a status variable dynamically updated to reflect the dominant axis (the scrolling axis variable).

The scrolling incremental commands generator 93 includes software routines that generate the corresponding incremental commands on receiving the scrolling strobes generated by scrolling timing generator circuit means 94, in accordance with the status of the scrolling axis variable and the scrolling sign variable to determine the current scrolling heading (north, south, east or west). The output generated by scrolling incremental commands generator 93 is linked to the available incremental scrolling routines of the application program to generate the corresponding visual effect on the computer's screen. This result is summarized in the following Table IV.

TABLE IV

| Dominant Axis | Lever's Displacement | Output Incremental Scrolling Commands |
| --- | --- | --- |
| X | + | → |
| X | − | ← |
| Y | + | ↑ |
| Y | − | ↓ |

The algorithms used for detecting the dominant axis of the cursor trail are based on sampling consecutive cursor positions at a fixed rate and storing them in a two-dimensional shift register data structure, to keep track of the cursor trail as it moves over the screen. For that purpose, the system must include a real-time clock means 97 to synchronize the sampling process. Since the method is based on analyzing backwards in time the relative cursor positions considering the current cursor position as the origin, only the incremental translation information is stored in the shift register. At each mouse input event, circuit means 91 inputs the x-y motion information and adds it in an x-y accumulator provided thereto. At the following real-time clock event, the contents of the accumulator are stored in the head position of the shift register, clearing then the accumulator to begin a new count. Hence, the contents of the accumulator represent the incremental x-y motion information generated by the mouse movement between two consecutive real-time clock events. The information stored in the tail of the shift register is then discarded, and the corresponding pointers are updated. The algorithm in processing circuit means 91 then analyzes the information stored in the shift register to detect pre-defined patterns to be interpreted as a scrolling axis user selection. The length of the shift register is customized according to the real-time clock rate, the average length of the pre-defined patterns and the user's mouse handling style.

Although a real-time clock is theoretically needed to track successive cursor positions in time, it is not needed if a serial format is used in the communication link between the mouse and the computer, since the timing information is implicit in the data transmission velocity set for the link. In this case, the incremental motion counts contained in the data packets comprising the serial format can be directly stored in the shift register data structure obtaining the same results while requiring less computer resources.

Figure 7A:
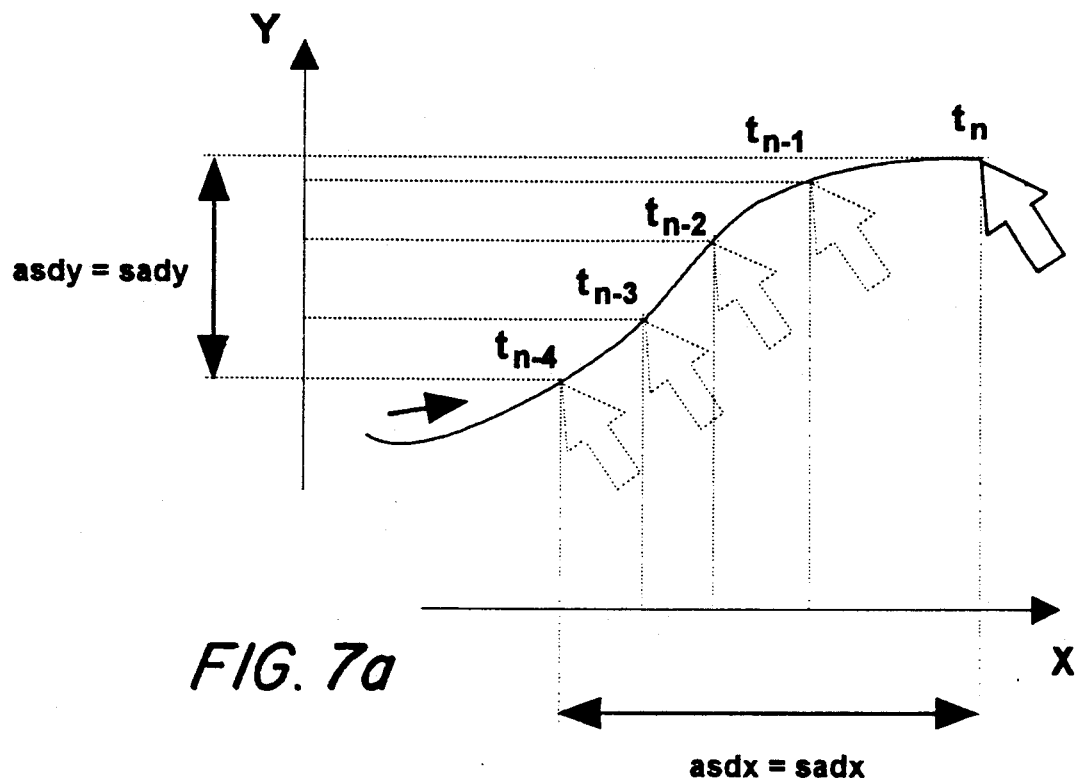
FIGS. 7a and 7b are x-y diagrams showing examples of cursor trajectories and their consecutive cursor positions, in which parameters calculated by the mouse driver to detect the dominant axis of the cursor trail according to the invention are also shown.
Figure 7B:
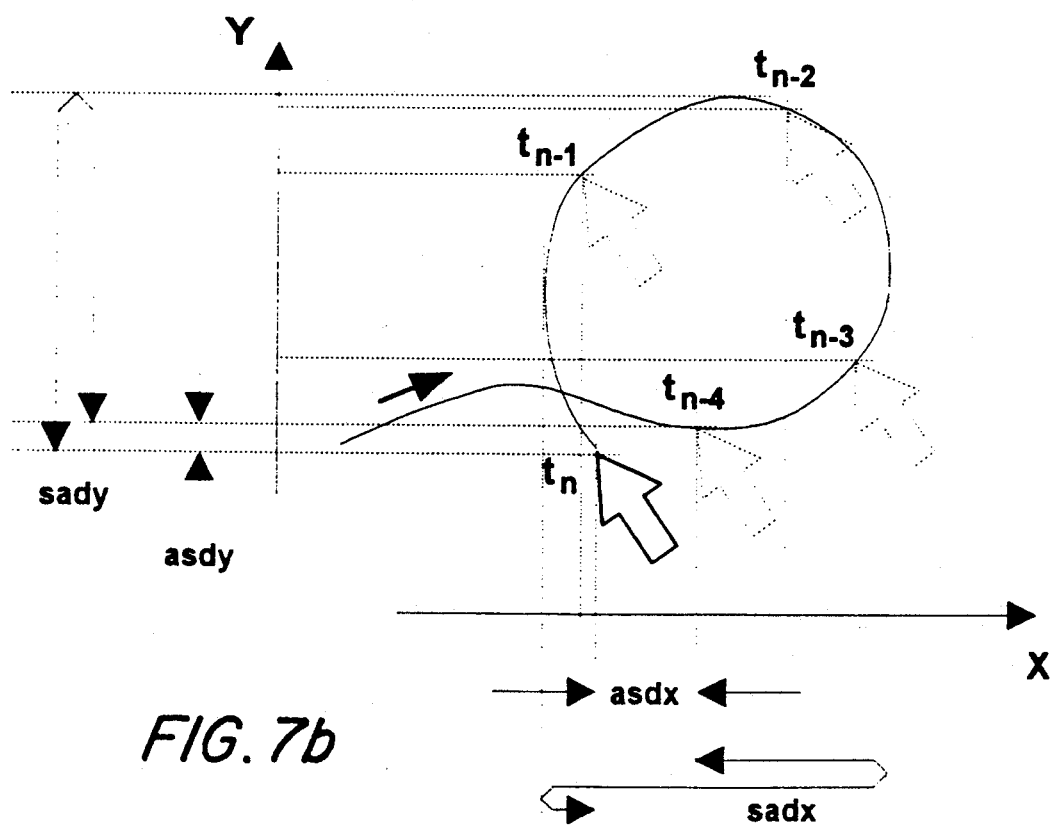

FIGS. 7a and 7b show two examples of possible cursor trajectories. FIG. 7a shows the trail generated by an almost horizontal cursor movement while FIG. 7b shows the trail generated by a circular cursor movement. In these figures the position of the cursor at any given time "$t_n$" is shown as a shaded arrow, and the previous cursor positions stored in the shift register are drawn in broken lines corresponding to previous times "$t_{n-1}$", "$t_{n-2}$", "$t_{n-3}$", . . . and so on.

A number of parameters can then be calculated from the information present in the shift register at each real-time clock event to detect the pattern "drawn" by the user with the mouse movement.

In particular for the scrolling control application disclosed herein, only two patterns are needed corresponding to the horizontal and vertical cursor movements (i.e., the x and y selected scrolling axis). A further enhancement can add a third pattern to allow the scrolling in a "z" axis in 3D data spaces (e.g., a 3D spreadsheet program).

In order to detect the patterns a group of four parameters are calculated by the algorithms. The list of these parameters and their definitions is as follows:

sadx: sum of the absolute values of the shift register contents in x direction;

sady: sum of the absolute values of the shift register contents in y direction;

asdx: absolute value of the sum of the shift register contents in x direction;

asdy: absolute value of the sum of the shift register contents in y direction.

If a two pattern code is used (i.e., only x or y detection), the algorithms are simply based on comparing the magnitudes of asdx and asdy. It is easily seen that the greater of both gives the dominant axis of the cursor's trail. Absolute values are compared because only axis information is needed in this case. The scrolling motion direction is set by the lever 78 displacement sign to allow a tight control and reduce mouse movement during the operation.

For a three pattern code (i.e., x-y-z scrolling), a simple approach is to define a more restrictive criteria to detect the x and y axis in order to differentiate these cases from a third default case (i.e., the "z" axis). This approach consists in detecting a linear motion (x or y) as a strictly "one way" well behaved orthogonal cursor motion (i.e., not oblique).

Such well behaved motions satisfy the following equations:

Horizontal motion:

$$sadx > sady * K1 \quad (1)$$

$$sadx < asdx * K2 \quad (2)$$

Vertical motion:

$$sady > sadx * K1 \quad (1')$$

$$sady < asdy * K2 \quad (2)$$

Equations 1 and 1' guarantee that the sum of the absolutes values of the incremental translation motion units in one axis are K1 times greater than the corresponding sum in the other axis. This guarantees that the trail is sufficiently horizontal or vertical, being the strictness of the test given by the value assigned to constant K1.

Equations 2 and 2' guarantee that the trail is clean enough in the sense that it has been "drawn" in just one direction straight forward (not in a back and forth fashion). The value of constant K2 grades the strictness of the test.

Thus the mouse driver updates the contents of the shift register and re-calculates in real time these equations to determine the pattern present in the cursor's motion path across the display means, to update the scrolling axis status variable.

Hence, if the user moves the mouse in one clearly horizontal or vertical direction, the dominant axis status variable is set to either "x" or "y" respectively. If the user "draws" a circle or any other similar figure through the mouse movement none of the equations is satisfied and the alternative "z" axis is assumed. The scrolling direction status variable is set accordingly.

In practice, initializing the constants K1 and K2 to the value 2 has proven to be effective to provide a clear enough differentiation between the three cases, using a 10-stage shift register and a time base of 30 milliseconds.

Figure 8:
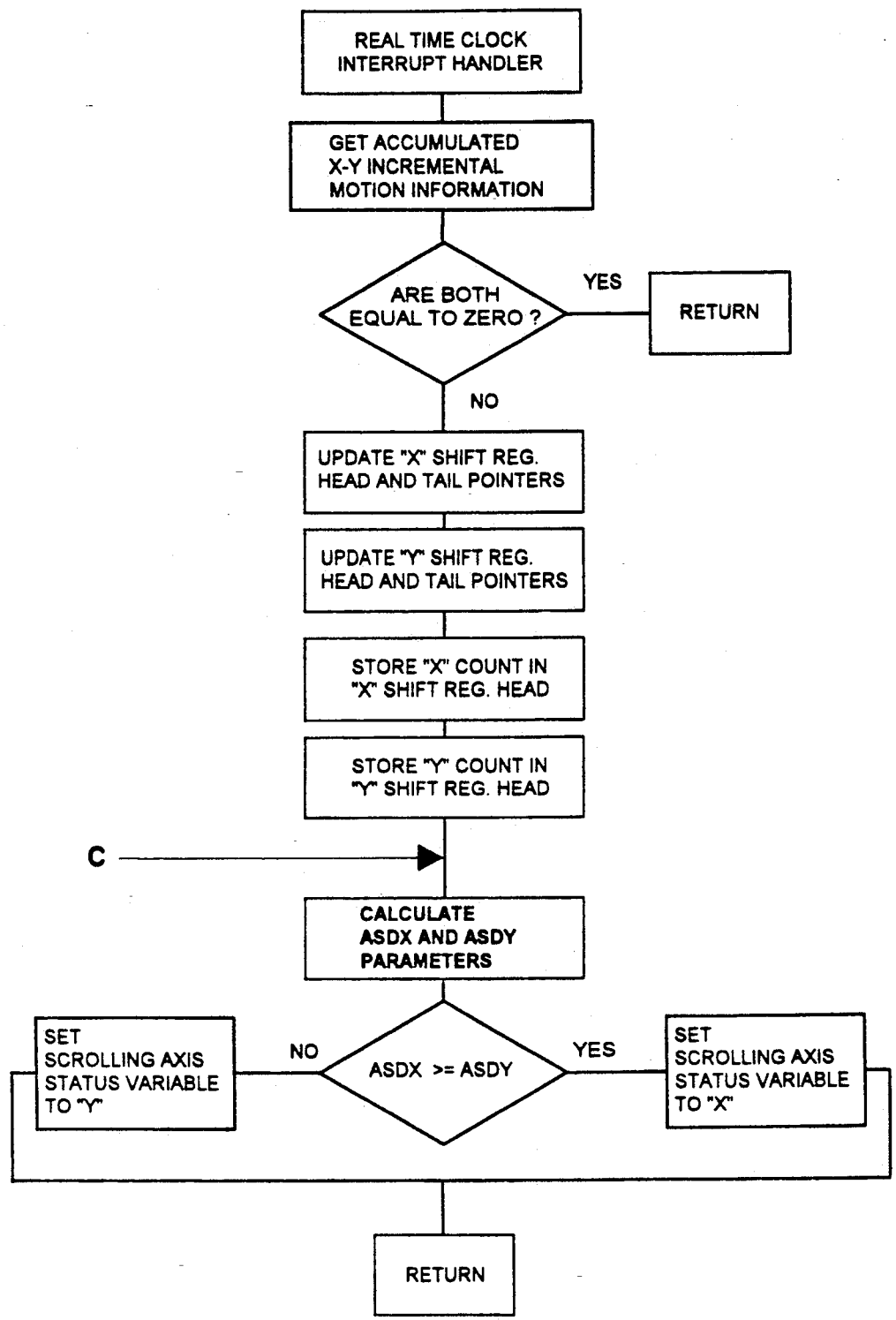
FIGS. 8 and 9 is a flow chart of the dominant scrolling axis detection algorithms in the method according to this invention.
Figure 9:
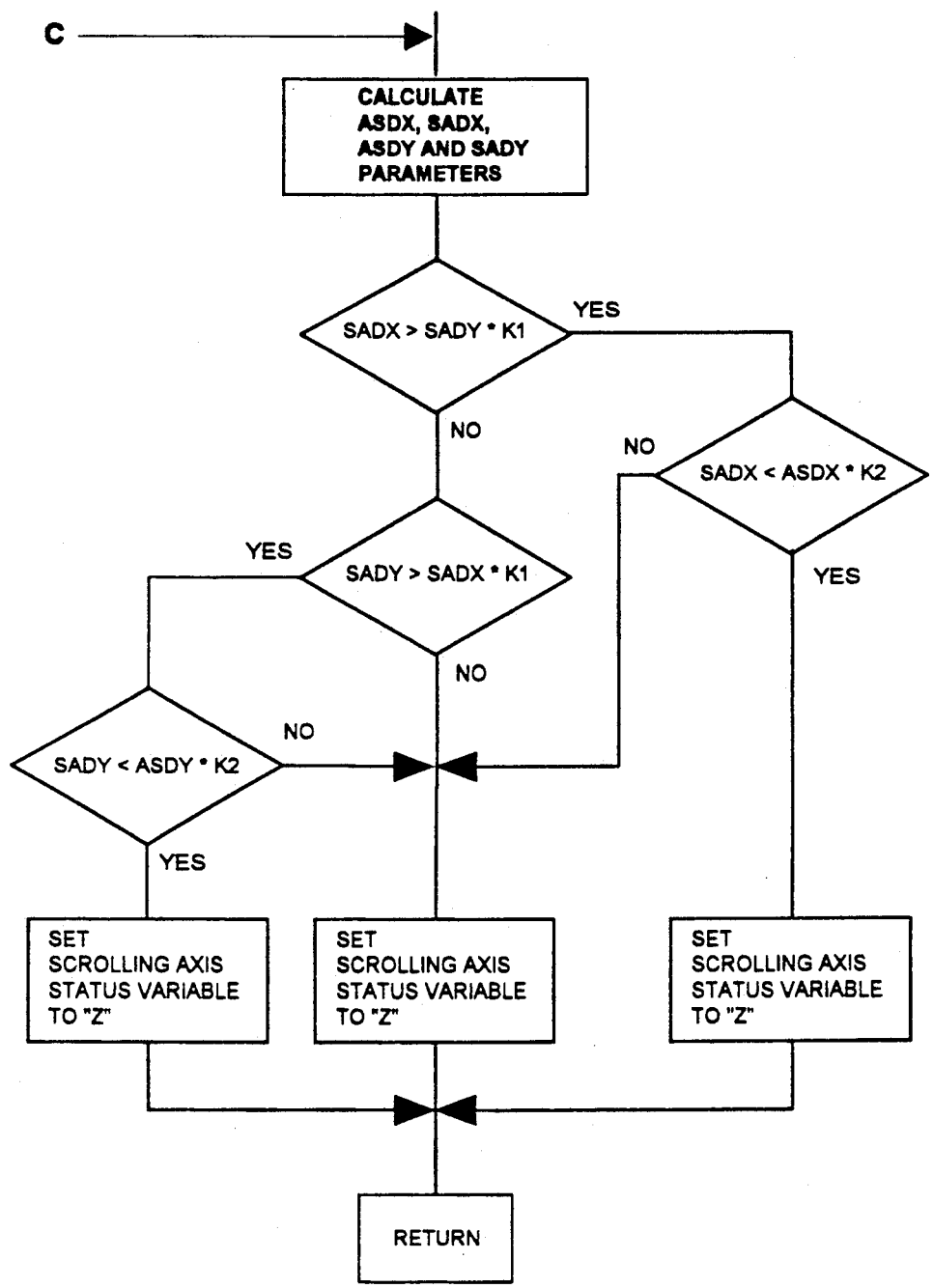

The flow charts corresponding to the algorithms disclosed are shown in FIGS. 8 and 9. FIG. 8 is the flow chart corresponding to a two-pattern detection algorithm. If the part of the flow chart of FIG. 8 after the point marked "C" is replaced by the flow chart of FIG. 9, the resulting flow chart corresponds to a three-pattern detection algorithm.

While the invention has been illustrated and embodied in a mouse for concurrent cursor position and cursor control, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. Mouse for interactive operation of a computer, said computer having display means for displaying information to an operator of said computer, said mouse comprising a first transducer means for generating x-y position signals for controlling movement of a cursor on said display means in response to movement of said first transducer means by a hand of an operator, and supplementary control means including a second transducer means for generating supplementary control signals for controlling scrolling operations for moving information entitles displayed on said display means, said second transducer means including a displaceable body and spring means connected to said displaceable body to spring-load said displaceable body so that said body is urged into an initial equilibrium position by said spring means but is displaceable from said equilibrium position in either of two directions by a digit of said hand of said user, said second transducer means being structured so that said supplementary control signals vary with a displacement amount and displacement direction of said body from said equilibrium position so that a rate of moving said information entities on said display means can be varied with said displacement amount and a direction of moving said information entities can be selected according to said displacement direction.

2. Mouse as defined in claim 1, wherein said supplementary control signal produced by said supplementary transducer means is substantially proportional to said displacement amount from said initial equilibrium position.

3. Mouse as defined in claim 2, wherein said supplementary control signal is an incremental digital signal.

4. Mouse as defined in claim 1, further comprising a housing and wherein said body comprises a pivotable lever mounted on a pivot axle in said housing, said pivotable lever being accessible to said digit of said hand.

5. Mouse as defined in claim 4, wherein said pivotable lever protrudes laterally from said housing so as to be easily operable by a thumb of said hand of said user.

6. Mouse as defined in claim 4, wherein said spring means comprises a V-shaped spring element in said housing, said spring element having V-arms and a vertex portion, said vertex portion being secured to said body in the vicinity of said pivot axle and said V-arms abutting against stationary stops provided in said housing to urge said body toward said initial equilibrium position, but said body being displaceable from said equilibrium position in either of two directions by said lever.

7. Mouse as defined in claim 6, further comprising a baseboard and a printed circuit board including logic circuit means, said baseboard being a fixed to said printed circuit board and said pivot axle and said stationary stops being attached to said baseboard so as to simplify assembly and minimize tolerances.

8. Mouse as defined in claim 7, wherein said displaceable body comprises said lever and an approximately semicircular part attached to said lever, said semicircular part having an internal slotted skirt coaxial to said pivot axle, and said baseboard having two optocouplers soldered thereto and connected electrically to the logic circuit means of said printed circuit board, each of said optocouplers consisting of a light source and a light detector, and said baseboard also having a complementary fixed skirt portion provided with two fixed slots spaced from each other and positioned between said light sources so as to alternately block and pass light from said light sources to said light detectors, said logic circuit means generating a digital lever position indicating signal, when said lever is displayed from said equilibrium position, indicative of the displacement amount and the displacement direction.

9. Mouse for cursor positioning and scrolling in interactive operation of a computer system said mouse comprising supplementary control means producing an electronic signal for scrolling and connected to computer means operated by an operator in an interactive manner, said computer means having display means and displaying data and/or program units on said display means during operation, said electronic signal being converted to scrolling commands in said computer means to move said data and/or program units on said display means, said supplementary control means including a movable body moveable in either of two displacement directions by a digit of a hand of the operator against spring means from an equilibrium position over a range of displacement amounts, no electronic signal being generated when said movable body is in said equilibrium position, said electronic signal has a signal strength varying with said displacement amount of said movable body from said equilibrium position at least over a portion of said range of said displacement amounts and said electronic signal also varies with said displacement direction so that a rate of moving said data and/or program units on said display means can be varied with said displacement amount and a direction of moving said data and or/program units can be selected according to said displacement direction; and first and second X-Y motion detection means providing other electronic signals input to said computer in response to relative motion of said X-Y motion detection means across a plane surface in X and Y directions, said X-Y motion detection means being moveable by the hand of the operator moving said movable body and said other electronic signals being input to said computer to move a position and/or unit indicating means across said display means.

10. Mouse as defined in claim 9, further comprising a housing and wherein said movable body comprises a lever protruding from said housing and pivotally mounted in said housing on a pivot axle, said lever being shaped so as to be easily operable by a thumb of the operator, and said spring means comprises a V-shaped spring element in said housing, said spring element having two V-arms and a vertex portion, said vertex portion being secured to said lever in the vicinity of said pivot axle and said V-arms abutting against stationary stops provided in said housing so as to urge said lever toward said equilibrium position when displaced from said equilibrium position but being displaceable in either of said displacement directions from said equilibrium position.

11. Mouse as defined in claim 10, further comprising a circuit board in said housing and having mouse driver means, said pivot axle being attached to said circuit board and said mouse driver circuit having lever motion signal generating means mounted thereon generating a digital lever motion signal substantially proportional to a displacement amount of said lever from said equilibrium position.

12. Method of operating a computer in an interactive manner by a user, said computer including a display means and a mouse connect to said computer, said mouse comprising means for generating x-y incremental movement information for positioning a cursor at any of a plurality of positions displayed on said display means during interactive operation, binary control means for generating binary control commands for said computer, supplementary control means for generating a supplementary control signal of variable sign and magnitude under control of said user, and communication means for transmitting said movement information and said binary control information to said computer; programmable circuit means in said computer for generating said display means, said display means including display areas accessible by said cursor for triggering excecution of scrolling commands on receipt of said binary control commands while said cursor is positioned on said predetermined display areas; said method comprising generating scrolling commands to move information items or characters displayed on said display means from said supplementary control signal by operation of said supplementary control means by said user, said method including generating of said scrolling commands including the steps of:

a) analyzing a trail of said cursor at periodic time intervals;

b) dynamically setting a status variable according to a dominant axis of said cursor trail at said time intervals;

c) according to the status variable determined in step b), setting a scrolling axis to a direction option, said direction options including an up-down option; a left-right option and a in-out option; and d) scrolling in a scrolling direction along said scrolling axis determined in step c) according to a sign of said supplementary control signal and the status of said status variable.

13. Method as defined in claim 12, further comprising scrolling in said scrolling direction at a rate determined by said magnitude of said supplementary control signal.

14. Method as defined in claim 12, wherein said supplementary control signal is a periodic signal and comprising scrolling in said scrolling direction at a rate determined by said period of said periodic signal.

15. Method as defined in claim 12, wherein said analyzing includes determining a position of said cursor on said display means at said periodic time intervals in terms of a coordinate system consisting of a plurality of cartesian coordinates determined by a plurality of cartesian axes.

16. Method as defined in claim 15, wherein said setting of said scrolling is such that said scrolling occurs along the one of said cartesian axes along which a cursor position difference during travel of said cursor along said trail is larger than another cursor position difference along the other cartesian axes.

17. Arrangement for operating a computer in an interactive manner by a user, said computer including a display means and a mouse connect to said computer, said mouse comprising means for generating x-y incremental movement information for positioning a cursor at any of a plurality of positions displayed on said display means during interactive operation, binary control means for generating binary control commands for said computer, supplementary control means for generating a supplementary control signal of variable sign and magnitude under control of said user, and communication means for transmitting said movement information and said binary control information to said computer; programmable circuit means in said computer for generating said display means, said display means including display areas accessible by said cursor for triggering excecution of scrolling commands on receipt of said binary control commands while said cursor is positioned on said predetermined display areas; said method comprising generating scrolling commands to move information items or characters displayed on said display means from said supplementary control signal by operation of said supplementary control means by said user, said arrangement comprising:

means for analyzing a trail of said cursor at periodic time intervals;

means for dynamically setting a status variable according to a dominant axis of said cursor trail at said time intervals;

means for setting a scrolling axis to a direction option, said direction options including an up-down option; a left-right option and an in-out option according to the status variable determined; and means for scrolling in a scrolling direction along said scrolling axis according to a sign of said supplementary control signal and the status of said status variable.

* * * * *